(12) United States Patent
Major et al.

(10) Patent No.: US 7,143,634 B1
(45) Date of Patent: Dec. 5, 2006

(54) PORTABLE FUEL STORAGE TANK LEAK DETECTION SYSTEM

(75) Inventors: William R. Major, Ventura, CA (US); Leslie A. Karr, Oak View, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/316,542

(22) Filed: Dec. 21, 2005

(51) Int. Cl.
*G01M 3/04* (2006.01)
(52) U.S. Cl. ............................... 73/49.2; 73/40; 73/299
(58) Field of Classification Search .................... 73/40, 73/49.2, 49.3, 45.5, 299; 340/605; 702/51
See application file for complete search history.

(56) References Cited

U.S. PATENT DOCUMENTS

| | | | | |
|---|---|---|---|---|
| 3,538,746 A * | 11/1970 | Ginsburgh et al. | ........... | 73/49.2 |
| 4,646,560 A * | 3/1987 | Maresca et al. | ............. | 73/49.2 |
| 4,760,747 A * | 8/1988 | Fackler | .................... | 73/864.65 |
| 5,072,625 A * | 12/1991 | Anderson | ................ | 73/864.63 |
| 6,148,854 A * | 11/2000 | Major et al. | ................ | 137/557 |

* cited by examiner

*Primary Examiner*—Hezron Williams
*Assistant Examiner*—Ryan Christensen
(74) *Attorney, Agent, or Firm*—David S. Kalmbaugh (57) ABSTRACT

A portable fuel storage tank leak detection system for detecting fuel leaks from a fuel storage tank at a leak rate of 0.1 gallons per hour. The leak detection system provides for a probability of detection of at least 95% and a probability of false alarm of no more than 5%.

20 Claims, 6 Drawing Sheets

PORTABLE FUEL STORAGE TANK LEAK DETECTION SYSTEM

BACKGROUND OF THE INVENTION

1. Field of the Invention

The present invention relates generally to a system for leak detection in storage tanks. More specifically, the present invention relates to a portable rapid test leak detection system for accurate and reliable leak detection in underground storage tanks which have a fuel storage capacity of between 50,000 gallons and 100,000 gallons.

2. Description of the Prior Art

In 1988, Environmental Protection Agency issued to the States Underground Storage Tank (UST) regulations for fuel storage. The UST regulations were issued to implement monthly monitoring and annual tightness testing of the USTs. Monthly monitoring of USTs requires that a leak detection system be certified to detect a leak rate of 0.2 gallons per hour (GPH) and annual tightness testing requires a certification to detect a leak rate of 0.1 GPH. Each certification requires a probability of detection of at least 95% and a probability of false alarm of no more than 5%.

The Department of the Navy owns and operates approximately 1267 underground storage tanks that have a storage capacity of less than 100,000 gallons. These tanks, commonly operating at base fuel farms, must comply with EPA, state, and local regulations and require that either an annual tightness test with monthly inventory reconciliation or monthly monitoring tests be conducted in accordance with published performance standards. Existing technologies either cannot meet performance standards for the large 50,000 to 100,000 gallon USTs or do not provide for a cost-effective solution to mandatory leak detection testing.

One leak detection method used in the past to detect leaks is the tracer method. The tracer method injects a UST with a known tracer chemical and takes samples from monitoring wells placed around the UST. If the tracer chemical is found in the monitoring well samples, the tank is declared to be leaking. There are however technical problems associated with this method of leak detection. For example, certain geologic and groundwater conditions exclude the tracer method's use at particular sites. Also, the cost of the tracer method is very expensive due to recurring sampling and analysis costs.

A wide variety of technologies are utilized to meet monthly and annual leak detection requirements of gasoline stations, which normally use storage tanks that have a storage capacity of 10,000 gallons, or less. In tank detectors are one of the most common leak detection systems for gasoline stations. However these systems, which are certified for 10,000 gallon tanks, do not meet performance standards for the 50,000 to 100,000 gallon tanks.

Bulk fuel tank leak detection systems, which are designed to detect leaks in USTs containing several million gallons of fuel, do have the technical capability to meet performance standards for 50,000 to 100,000 gallon tanks. However, bulk leak detection systems are very expensive, heavy, usually non-portable, can be very slow to stabilize, and may require rigorous operator input and analysis.

Statistical Inventory Reconciliation (SIR) is another common method of UST leak detection. However, this method is very labor intensive in that is requires daily hands-on monitoring. This method does not work well for tanks having a low frequency of fuel transfers (typical of larger tanks), and cannot detect leaks in real time.

SUMMARY OF THE INVENTION

The present invention overcomes some of the difficulties of the past including those mentioned above in that it comprises a highly effective and efficient portable fuel storage tank leak detection system for detecting leak rates from 0.2 gallons per hour to leak rates 0.1 gallons per hour.

The leak detection system comprising the present invention is a major improvement over current apparatus and method for leak detection by providing superior accuracy, flexibility, portability, and short test duration all at significantly lower costs over prior methods and apparatus. The leak detection system operates as a low range differential pressure (LRDP) system and achieves a very high level of performance detecting small leaks because of it is very precise and also compensates for thermal expansion and contraction of the fuel in the tank, the instrumentation, and the tank utilizing a commercially available differential pressure sensor. The leak detection system also provides for a portable and highly cost-effective method for complying with both monthly and annual regulatory tank testing standards and can service multiple tanks in a fuel tank farm.

The leak detection system is inserted into an underground fuel storage tank for the purpose of detecting fuel leaks from the fuel storage tank. An operator lowers a reference tube which is a component of the leak detection system through a tank access port into the fuel storage tank. The reference tube rest on the bottom of the fuel storage tank when the reference tube is fully inserted into the fuel storage tank. The key components of the leak detection system are:

1. A reference tube that is equal to or greater in length than the diameter of the fuel storage tank being tested for fuel leaks.
2. A sliding seal affixed to the bottom of the reference tube in slidable engagement with the reference tube.
3. A differential pressure transducer mounted on the side of the reference tube adjacent to the sliding seal.
4. Electrical conductors which connect the differential pressure transducer to the system's electronics including a laptop computer located outside of the fuel tank.
5. The electronics includes a signal conditioner, terminal block, and Peripheral Component Microchannel Interconnect Architecture Analog to Digital (PCMCIA A/D) card.

A conditioned electrical signal from the differential pressure transducer is processed by leak detector software loaded onto the laptop computer. The electrical signal when processed by the computer determines if there are fuel leaks from a fuel storage tank which exceeds the regulatory minimums of 0.1 gallons per hour and 0.2 gallons per hour.

DETAILED DESCRIPTION OF A PREFERRED EMBODIMENT OF THE INVENTION

Figure 1:
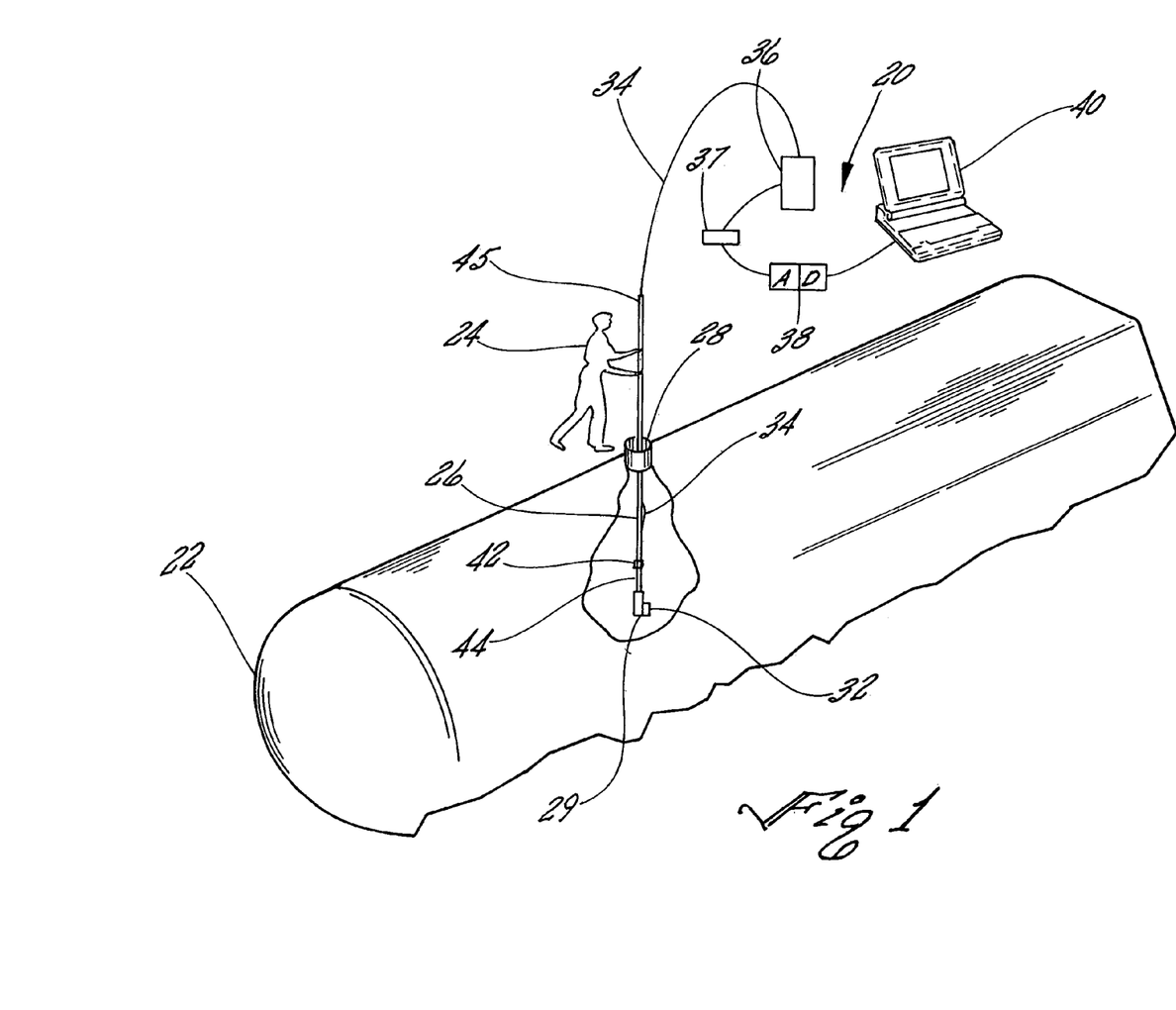
FIG. 1 is a schematic diagram which illustrates the portable fuel storage tank leak detection system being used to check an underground fuel storage tank for leaks.

Referring to FIG. 1, the leak detection system 20, designed to test for fuel in underground fuel storage tanks, is first inserted into an underground fuel storage tank 22 which contains jet fuel. The operator 24 lowers a reference tube 26 into the storage tank 22 through an 8-inch diameter tank access port 28. The reference tube 26 rest on the bottom of the storage tank 22 when the reference tube 26 is fully inserted into the tank 22. The reference tube 26, which is a shaped reference tube having diameter of ¼" to 6", is equal to or greater in length than the diameter of tank 22.

Leak detection system 20 includes a sliding seal 29 which is affixed to the bottom end of the reference tube 26. A differential pressure transducer 32 mounted on the side of the reference tube 26 adjacent to the sliding seal 29. Differential pressure transducer 32 and reference tube 26 each have planar faces which are clamped and sealed directly against each other.

Electrical conductors/cable 34, attached to the outer surface of reference tube 26, connect the differential pressure transducer 32 to an electronics package outside of the fuel tank 22. The electronics package consists of a signal conditioner 36, terminal block 37, and Peripheral Component Microchannel Interconnect Architecture Analog to Digital (PCMCIA A/D) card 38. A conditioned electrical signal is processed by leak detector software loaded onto a laptop computer 40. The laptop computer 40 may be any commercially available windows compatible laptop computer. The analog to digital card 38 is inserted into a slot in the laptop computer 40.

The differential pressure transducer used in the preferred embodiment is a Low Range Wet-Wet Differential Pressure Transducer commercially available from multiple commercial sources.

Figure 2:
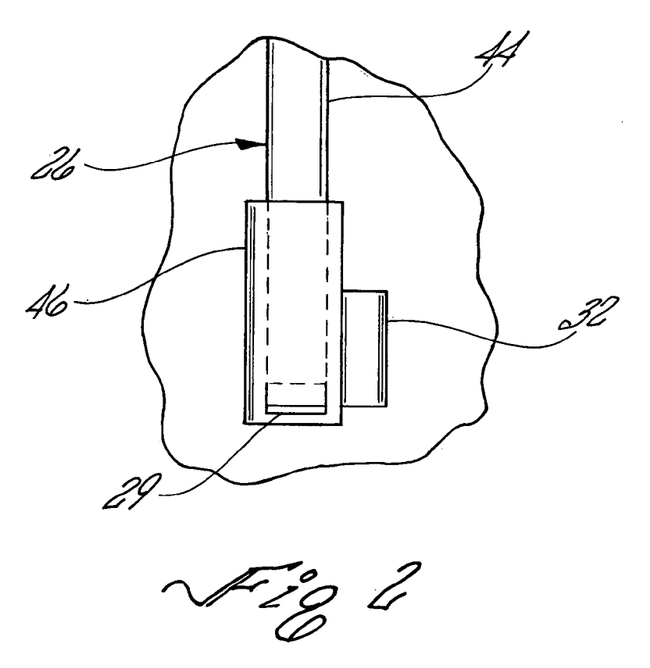
FIG. 2 is a detailed schematic diagram illustrating one variation of the slidable seal and pressure transducer for the leak detection system of FIG. 1.

Referring to FIGS. 1 and 2, the leak detection system 20 includes a tank fuel level sensing unit which has vertical reference tube 26 that spans the full height of the storage tank 22. The reference tube 26 has a straight or shaped cross-sectional area that matches, with a constant ratio, the cross-sectional shape of the fuel storage tank 22 being tested for leaks. The bottom section 44 of the reference tube 26 is about 8 to 12 inches in length and is detachable from the upper portion 45 of reference tube 26. A quick disconnect mechanism 42 is included in the fuel level sensing unit allowing the operator 24 to disconnect the lower portion 44 of reference tube 26 from the upper portion 45 of reference tube 26.

Figure 4A:
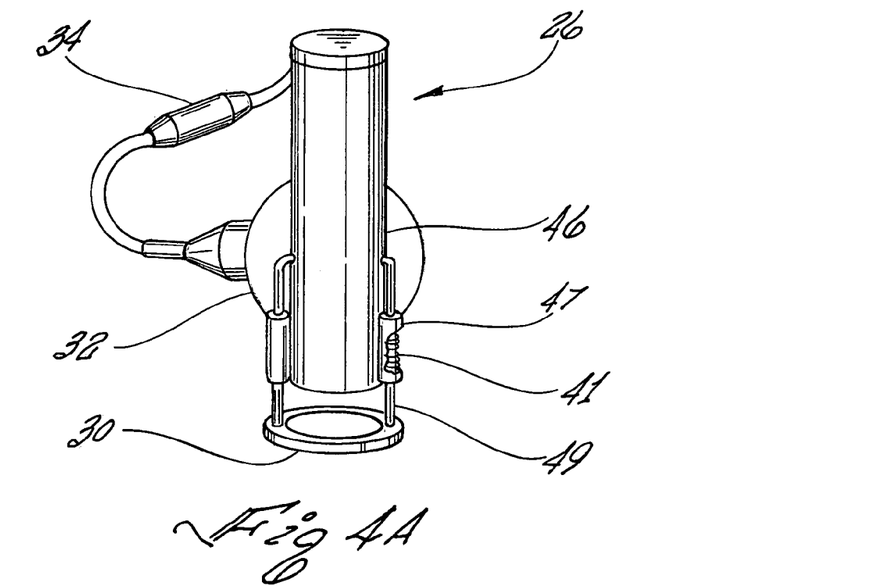
FIGS. 4A and 4B illustrate a second variation of the sliding seal which includes a housing and spring loaded seal with FIG. 4A illustrating the sliding seal in an open position and FIG. 4B depicting the sliding seal closed when the leak detection system is at rest on the bottom of the fuel storage tank under test.
Figure 4B:
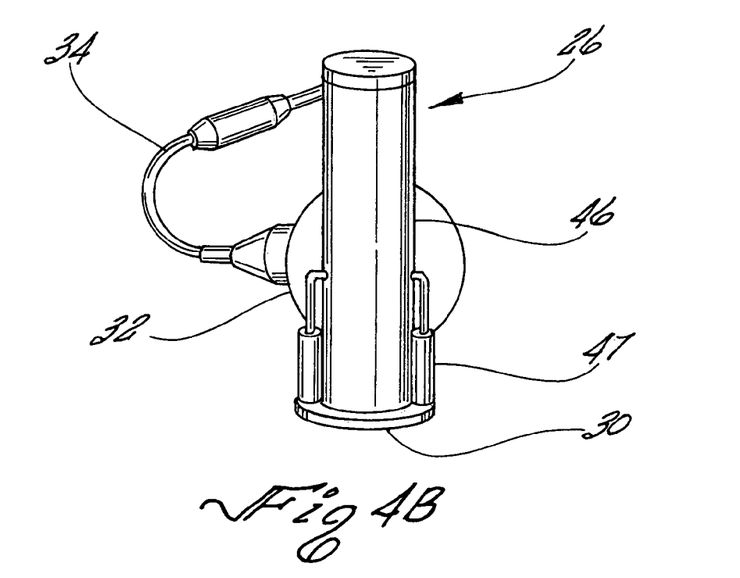

Referring to FIGS. 4A and 4B, attached to the bottom section of the reference tube 26 is a sliding seal 30 that is spring loaded so as to be in a normally open position as shown in FIG. 4A. The sliding seal 30 is designed so that, when the seal 30 is resting on the bottom of the fuel tank 22 under test, the weight of the reference tube 26 overcomes the sliding seal spring force provided by springs 41 within housing 47 closing the sliding seal 30 at the bottom of the reference tube 26 (FIG. 4B). The closure of sliding seal 30 prevents additional fuel from entering into the reference tube 26.

The sliding seal 29 (FIGS. 1 and 2) and sliding seal 30 (FIGS. 4A and 4B) may be fabricated from a multitude of resilient material configurations including sheet seals, o-rings, ball shaped, curvilinear and non-resilient material configurations including metal to metal, ceramic to metal, plastic to metal, etc. The seal is also non-degrading.

Differential pressure transducer 32 is attached to the side of a sliding seal housing 46 positioned at the bottom section 44 of the reference tube 26 and is adjacent to the sliding seal 29 (FIG. 2) or sliding seal 30 (FIG. 4A). Differential pressure transducer 32 measures the pressure difference between the height/mass of the fluid in reference tube 26, and the height/mass of the fluid in the storage tank 22 under test for fuel leaks.

To minimize fluid cavity areas that can trap or contain vapor bubbles, the pressure transducer 32 is mounted directly to sliding seal housing 46 adjacent the reference tube 26 without the use of external tubing. To provide quick thermal stabilization, the body of the pressure transducer 32 is of a type that can be directly immersed in the fuel within storage tank 22 without use of a containment vessel. The bottom section 44 of reference tube 26, the sliding seal 30, and the differential pressure transducer 32 comprises a modular unit that can be attached to any length of the upper section 45 of reference tube 26 so that the leak detection system 20 can be adapted to any fuel storage tank configuration.

Figure 3:
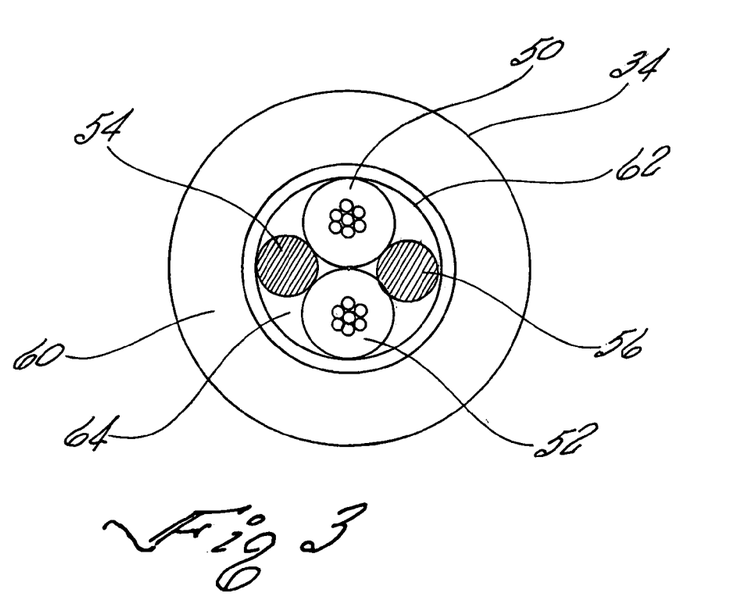
FIG. 3 is a view illustrating the submersed water/fuel cable used in the portable fuel storage tank leak detection system of FIG. 1.

Referring to FIG. 3, the electrical conductors 50 and 52, and solid copper wires 54 and 56 within cable 34 are hermetically sealed to the differential pressure transducer 32 and are contained in a fuel resistant jacket. The electrical cable 34 is attached to the outside of the reference tube 26, runs along the full length of the reference tube 34, and has approximately 20 feet to 30 feet of additional cable length available for routing to the electronics package outside the fuel tank 22 being tested for a fuel length. The electronics package consists of a signal conditioner 36, power supply, terminal block and PCMCIA A/D card 38. The signal conditioner 36 supplies an intrinsically safe 4 ma to 20 ma supply current to the differential pressure transducer 32. The pressure transducer modifies the magnitude of the supply current, which is an analog test signal in relation to actual pressure differentials developed between the reference tube 26 and the fuel tank 22 under test. The analog test signal is then output from the signal conditioner 36 as a 1 Volt to 5 Volt signal. This analog signal is then fed to the laptop computer PCMCIA A/D card 38 for conversion from an analog format to a digital format. Leak detection software installed in the laptop computer 40 reads the PCMCIA A/D card generated digital signal and provides signal conversion to pressure change over time or gallon per hour leak rates, input of conversion factors, real time graphing of test leak rate, test start and stop functions, test parameter description notes and real time data saving capabilities. The saved test data is downloaded into to a spreadsheet, which may be an Excel spreadsheet for further analysis by an operator.

The electrical conductors 50, 52, 54 and 56 within cable 34 are encircled by a Mylar tape 58, which is surrounded by a Polyurethane jacket 52 having a nominal thickness of 0.050 inches. A copper braid shield is positioned within electrical cable 34 between the Mylar tape 58 and the electrical conductors 50, 52, 54 and 56 within cable 34. Conductors 50 and 52 are No. 24 AWG bundled copper conductors with polypropylene insolation jacket, and conductors 54 and 56 are AWG No. 18 solid bare conductors. The interstices 64 between the electrical conductors 50, 52, 54 and 56 within cable 34 are water blocked.

The portable fuel storage tank leak detection system 20 is designed for and recommended for testing tanks containing lower volatile heavier type fuels such as diesel, JP-5 fuel, JP-8 fuel. All on-site fuel farm operational safety procedures must be consulted and adhered to when utilizing leak detection system 20. The following is an example of a sequence for conducting a leak detection test on a large underground storage tank.

Referring to FIGS. 1 and 2 an operator 24 identifies the underground fuel storage tank 22 to be leak tested for leaking fuel from the tank 22. The operator 24 assures that all inlet and outlet valves to the tank 22 to be tested for fuel leaks are securely closed, and that no fuel transfers into or out of the tank 22 occur during leak testing.

The operator 24 needs to wait a specified time period after any fuel transfer for static electricity to dissipate in the tank 22 by consulting and adhering to all on-site fuel farm safety procedures. Time periods may vary from seconds to an hour or more. Operator 22 opens the tank access port 24 which is generally an 8 inch inside diameter port to insert leak detection system 20 into tank 22.

The operator 24 transports the leak detection system 20 over to the tank access port 28 for the tank 22 under test with the reference tube 26 in the horizontal position. The leak detection system 20 weighs less than 20 lbs and can be handled by one operator without assistance. The operator 24 electrically grounds the leak detection system 20 to the tank shell for tank 22 and rotates the reference tube 26 to the vertical position in preparation for lowering the reference tube 26, sliding deal housing 46 and pressure transducer 32 of leak detection system 20 into the tank 22.

Using hand over hand grip movements along the reference tube 24 (as shown in FIG. 1), the operator 24 slowly lowers leak detection system 20 through the access port 28 into tank 22. Since the sliding seal 30 at the bottom portion 44 of the reference tube 26 is held normally open by spring force, the reference tube 26 fills with fuel as the reference tube 26 is lowered into the tank 22. This procedure creates a vertical fuel temperature and density profile inside reference tube 26 which almost identical to the vertical profile outside reference tube 26 which is the interior of tank 22. Fuel temperature/density profiles provide quicker system stabilization thereby reducing waiting time before starting leak tests.

The operator 24 allows the reference tube 26 to rest on the bottom of the tank 22 with the sliding seal closing under the weight of the reference tube 26. With the sliding seal 30 closed as shown in FIG. 4B, the differential pressure gauge 32 detects the pressure difference between the reference tube side and the tank side. The pressure difference detected by differential pressure gauge 32 allows an operator 24 using leak detection system 20 to accurately detect changes in fuel height within tank 20 in a 0.0001 inch to 0.001 inch range. It should be noted that leak detection system does not measuring the full height of fuel stored in the tank 22.

The operator 22 next secures the reference tube 26 to the access port 28 for tank 22 using for example an elastic cord. Hard mounting of the reference tube 26 to the access port 28 is not recommended as thermal expansion and contraction may lift the reference tube 26 off the tank bottom and produce large errors in leak detection test results.

The operator 24 connects the differential pressure gauge conductor cable 34 to the signal conditioner 36. The output of signal conditioner 36 is connected to terminal strip 37 and the output of terminal strip 37 is connected to the input for laptop computer PCMCIA A/D card 38. The operator turns on the laptop computer 40 and starts the leak detection software. The operator enters the site-specific test parameters and selects the "Start Test" icon. Leak test final results can be obtained in less than 5 hours.

Referring to FIGS. 4A and 4B, FIG. 4A illustrates the sliding seal housing 46 and spring loaded seal 30 as the seal comes to a rest position on the bottom of the fuel storage tank 22. The springs 41 which keep the seal open are located in a pair of spring housings 47 located one hundred eighty degrees apart from one another attached to housing 46. Extending vertically downward from each of the spring housings 47 is a spring strut 49 which holds the seal 30 open until the seal comes to rest on the bottom of the tank 22 being tested. As shown in FIG. 4B, When the seal 30 is at rest on the bottom of the fuel storage tank under test, the weight of the reference tube 26 overcomes the spring force generated by the spring 41 within each spring housing 47 closing the seal 30. The closure of seal 30 prevents additional fuel from entering into the reference tube 26.

Figure 5:
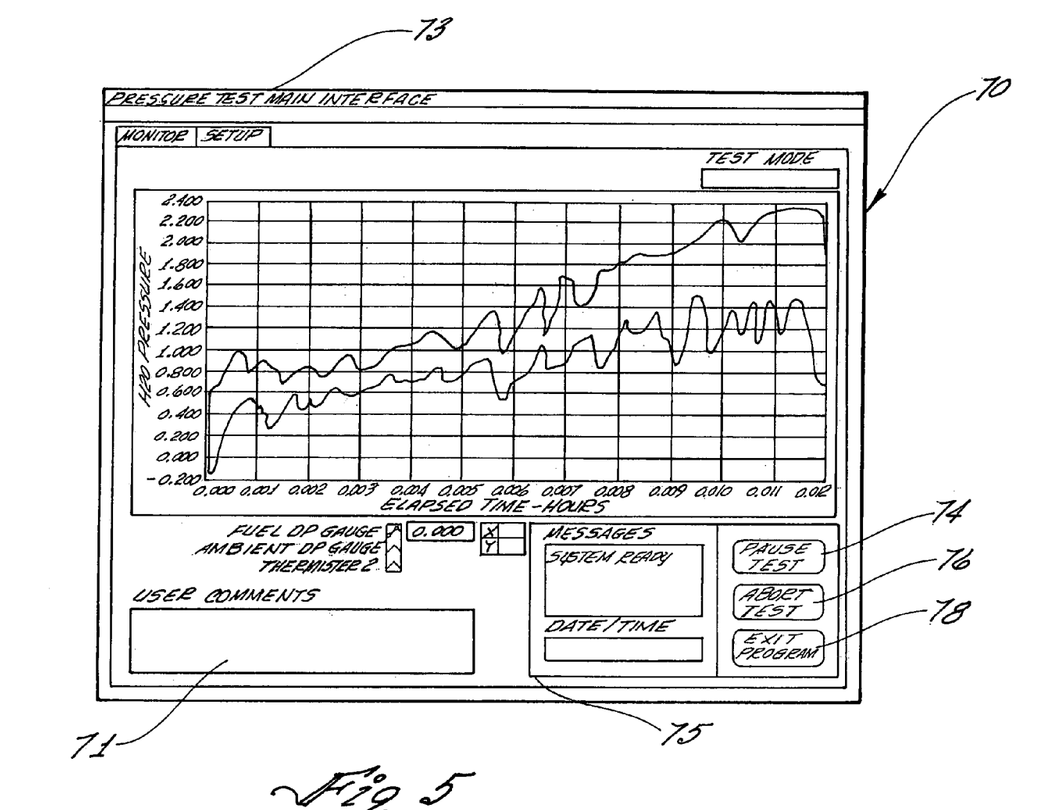
FIG. 5 illustrates the computer screen for displaying leak detection data generated by the software used in the laptop computer of the leak detection system of FIG. 1.
Figure 6:
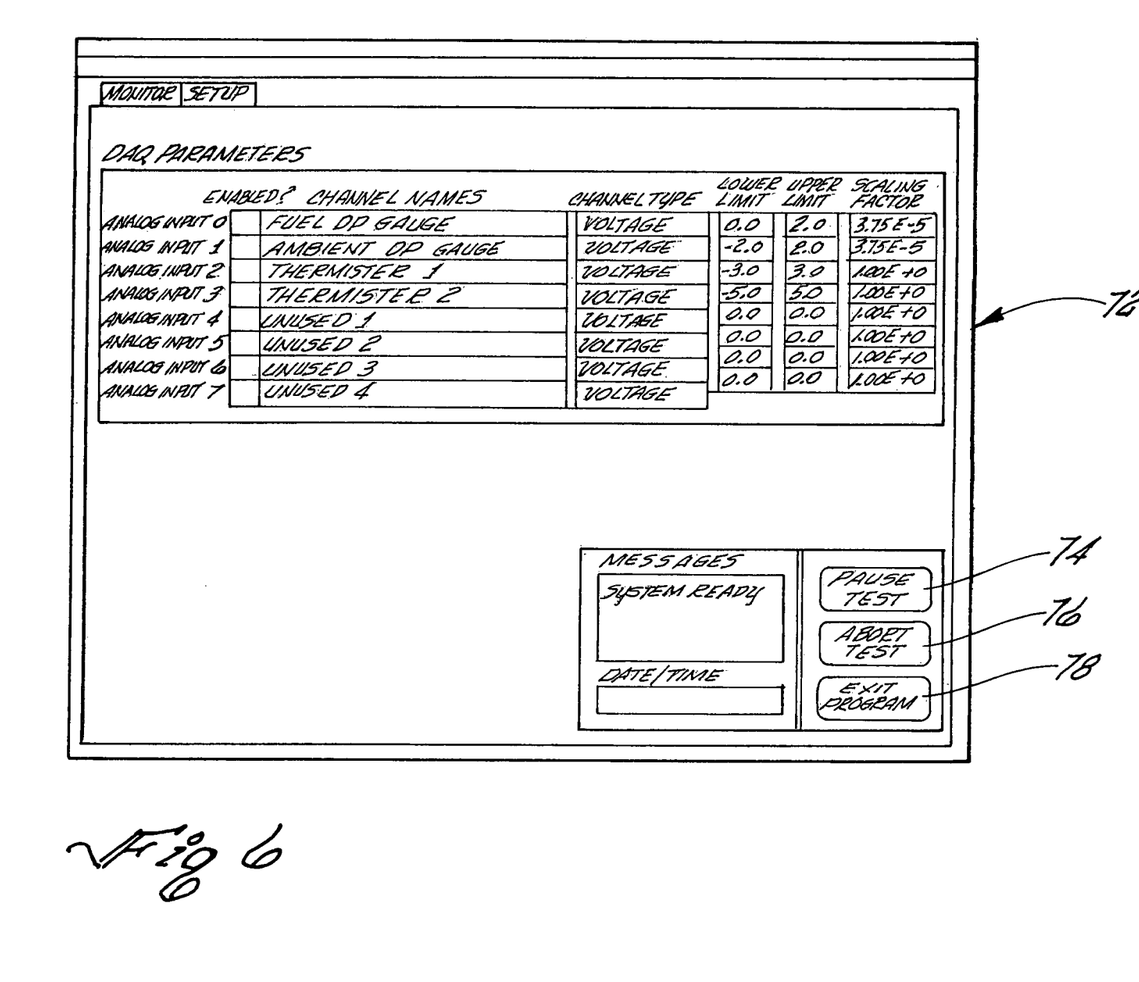
FIG. 6 illustrates the computer screen for enabling and calibrating the testing functions of the leak detection system of FIG. 1.

Referring to FIGS. 5 and 6, FIG. 5 illustrates the laptop screen 70 for displaying pressure differential data measured by the pressure transducer 32. The screen 70 which is the monitor screen, illustrates leakage data with the Y-axis depicting "H2O pressure" and the X-axis depicting time in hours. Leak detection software loaded into laptop computer 40 allows for a user specified number of data acquisition channels with names in a specified voltage range.

As shown in FIG. 6, the data acquisition channels displayed on laptop display screen 72, which is the setup screen, are fuel GP gauge which analog input 0, ambient GP gauge which is analog input 1, thermistor 1 which is analog input 2 and thermistor 3 which is analog input 4. The voltage ranges are 0.0 to 2.0 volts for input 0, −2.0 to 2.0 volts for input 1, −3.0 to 3.0 for input 2 and −5.0 to 5.0 for input 3. The scaling factor for analog inputs 0 and 1 is 3.57E−5 and the scaling factor for analog inputs 2 and 3 is 1.0. Analog inputs 4–7 are unused.

The steps required for an operator to configure and run a leak detection test of fuel storage tank are as follows. Using the setup screen 72, the operator specifies the channels to be enabled on the setup tab which is screen 72 (FIG. 6). For each channel enabled, channel name, channel type, voltage range and scaling factor are also specified. A User Comments field 71 on the monitor screen 70 allows the operator to enter comments for storage in the data header file for the leakage test. To initiate a leakage test, the operator selects Leakage test under the operator/test pull down menu 73 located in the upper right hand corner of the computer screen. This selections grays out the Data Acquisition parameters block on the setup screen 72 which prevents the operator from changing parameters during a leak test.

Setup of a test profile graph which includes format, precision, mapping mode and auto scaling functions can be modified using a scale legend 75 located beneath the x-axis of the graph If the operator decides to use a manual mode, the operator can disable auto scaling and set the desired x-axis and y-axis maximums by double-clicking and typing in a value on the x-axis and y-axis. The leakage detection software includes a Pause test button 74, an Abort test button 76 and an Exit program button 78.

Logging of pressure differential data to an ASCII file occurs at 45 second intervals, that is a one sample is recorded on the hard disk every 45 seconds. Approximately one data sample is visible to the user to the operator every second on graph appearing on the monitor screen 70.

Analog input channels Fuel DP Gauge and Ambient DP Gauge have ranges of 0 to 5 volts with the capability to increase resolution for different test. The excel file is set up to read to 0.001 mV with a conversion factor of 0.0000375H2O/mV. The sampling rate was selected to be eery 45 seconds which equates 0.0125 hr per sample. This results in each sample adding 0.0125 hr to the previous sample. Two analog input channels for temperature readings are provided to run bench scale test using sealed thermistors.

Using a 50,000 gallon tank for certification test, leak detection system 20 was able to make highly precise measurements from the tank. The leakage rate was measured at 0.067 gallons per hour with a PD=95% (probability of detection) and a PFA=5% (probability of false alarm). In practice this equates to measurement precession rate of 0.01 gallons per hour at a PD=98.9% and a PA=0.6%. The average test duration was about five hours. A measured leak rate having an accuracy of 0.10 gallons per hour satisfies EPA annual precision testing requirements.

Figure 7:
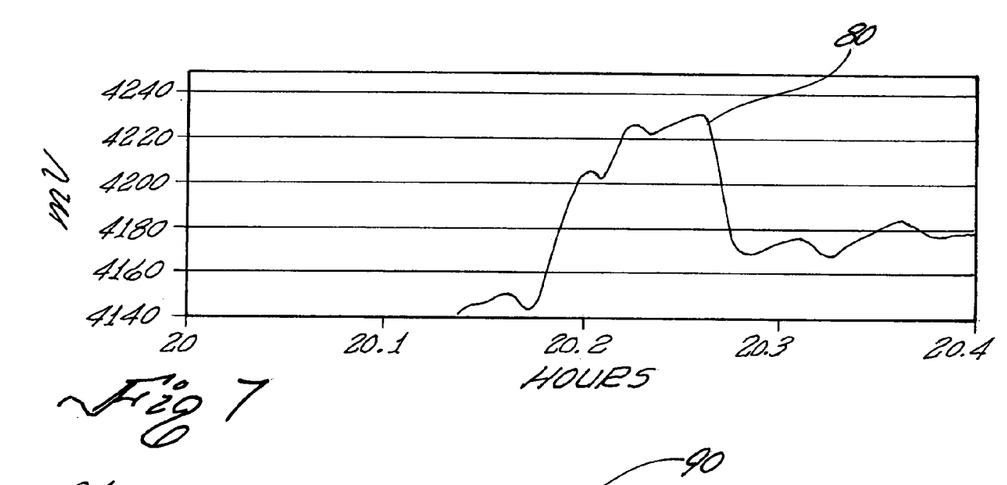
FIG. 7 illustrates a calibration plot for the portable fuel storage tank leak detection system of FIG. 1.
Figure 8:
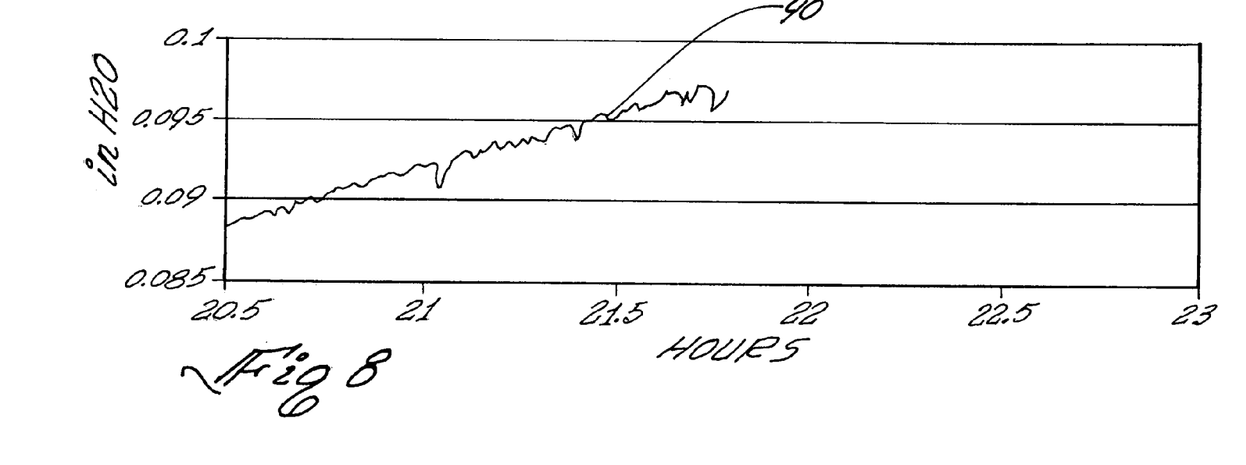
FIG. 8 illustrates a plot for measured leak detection from a test tank using the portable fuel storage tank leak detection system of FIG. 1.

Referring to FIG. 7, FIG. 7 depicts a calibration plot 80 for the leak detection system 20. Calibration with two quarts of fuel removed is equal to 0.00131 inches per 62 mV, which is equivalent to 0.0000211 inches per mV. Referring to FIG. 8, there is shown a measured leak plot 90 of fluid leaking from a test tank over a time period of 1-¼ hours. The induced leak rate at the end of the test was equal to 2.25 gallons per hour and 2.32 gallons per hour. The plot is generated using Microsoft's Excel program from the pressure differential/leakage data provided by the software loaded into laptop computer 20.

What is claimed is:

1. A portable fuel storage tank leak detection system for detecting fuel leaks from a fuel storage tank comprising:
   (a) a reference tube having a length of at least the diameter of said fuel storage tank wherein an operator lowers said reference tube into said fuel storage tank through an access port within said fuel storage tank to test for said fuel leaks;
   (b) a seal housing positioned at a lower end of said reference tube;
   (c) a seal affixed to the bottom end of said seal housing in slidable engagement with said reference tube, wherein said seal is normally held in an open position allowing fuel to enter said reference tube as said operator lowers said reference tube into said fuel storage tank, said seal closing when said reference tube engages the bottom of said fuel storage tank to prevent said fuel within said reference tube from exiting said reference tube; and
   (d) a differential pressure transducer mounted on said seal housing, said differential pressure transducer measuring a pressure differential between said fuel within said reference tube and said fuel external to said reference tube and stored within said fuel storage tank, said differential pressure transducer generating an electrical signal containing pressure differential data which is indicative of said pressure differential measured by said differential pressure transducer.

2. The portable fuel storage tank leak detection system of claim 1 further comprising:
   (a) a signal conditioner connected to said differential pressure transducer, said signal conditioner conditioning said electrical signal to provide an analog signal having a preset voltage range;
   (b) a digital computer having an analog to digital converter, said analog to digital converter being connected to said signal conditioner to receive said analog signal and then convert said analog signal to a digital signal for processing by said digital computer; and
   (c) a computer program contained within said digital computer, said computer program controlling handling and interpretation of said pressure differential data by said digital computer, said computer program displaying said pressure differential data on a display screen for said digital computer, said pressure differential data being displayed on said display screen to allow said operator to monitor a rate of fuel leakage from said fuel storage tank; and
   (d) an electrical cable which connects said differential pressure transducer to said signal conditioner to supply said electrical signal to said signal conditioner.

3. The portable fuel storage tank leak detection system of claim 1 further comprising a quick disconnect mechanism located within said reference tube, said quick disconnect mechanism allowing an operator to disconnect a lower portion of said reference tube including said seal housing and said differential pressure transducer from an upper portion of said reference tube.

4. The portable fuel storage tank leak detection system of claim 1 wherein said differential pressure transducer has an operational capability when directly immersed in said fuel within said fuel storage tank.

5. The portable fuel storage tank leak detection system of claim 1 wherein said computer program stores a sample of said pressure differential data to an ASCII file at 45 second intervals.

6. The portable fuel storage tank leak detection system of claim 1 wherein said seal is a non-degrading seal comprising a flat seal, an o-ring seal, a ball shaped seal or a curvilinear seal.

7. The portable fuel storage tank of claim 1 wherein said reference tube has a straight cross-sectional area or a shaped cross-sectional area that matches, with a constant ratio, a cross-sectional shape of said fuel storage tank being tested for said fuel leaks.

8. The portable fuel storage tank leak detection system of claim 1 wherein a sample of said pressure differential data is visible on said display screen to said operator at one second intervals.

9. The portable fuel storage tank leak detection system of claim 1 wherein said differential pressure transducer and said reference tube each have planar faces which are clamped and sealed directly against each other.

10. The portable fuel storage tank leak detection system of claim 1 wherein said portable fuel storage tank leak detection system is capable of measuring said fuel leaking from said fuel storage tank at a rate of 0.067 gallons per hour with a probability of detection of ninety five percent.

11. A portable fuel storage tank leak detection system for detecting fuel leaks from a fuel storage tank comprising:
   (a) a reference tube having a length of at least the diameter of said fuel storage tank wherein an operator lowers said reference tube into said fuel storage tank through an access port within said fuel storage tank to test for said fuel leaks;
   (b) a seal housing positioned at a lower end of said reference tube;
   (c) a seal affixed to the bottom end of said seal housing in slidable engagement with said reference tube, wherein said seal is normally held in an open position allowing fuel to enter said reference tube as said operator lowers said reference tube into said fuel storage tank, said seal closing when said reference tube engages the bottom of said fuel storage tank to prevent said fuel within said reference tube from exiting said reference tube;

(d) a differential pressure transducer mounted on said seal housing, said differential pressure transducer measuring a pressure differential between said fuel within said reference tube and said fuel external to said reference tube and stored within said fuel storage tank, said differential pressure transducer generating an electrical signal containing pressure differential data which is indicative of said pressure differential measured by said differential pressure transducer;

(e) a signal conditioner connected to said differential pressure transducer, said signal conditioner conditioning said electrical signal to provide an analog signal having a preset voltage range;

(f) a digital computer having an analog to digital converter, said analog to digital converter being connected to said signal conditioner to receive said analog signal and then convert said analog signal to a digital signal for processing by said digital computer;

(g) a computer program contained within said digital computer, said computer program controlling handling and interpretation of said pressure differential data by said digital computer, said computer program displaying said pressure differential data on a display screen for said digital computer, said pressure differential data being displayed on said display screen to allow said operator to monitor a rate of fuel leakage from said fuel storage tank, said computer program storing a sample of said pressure differential data to an ASCII file at approximately 45 second intervals; and (h) a spreadsheet software contained within said digital computer, said spreadsheet software utilizing samples of said pressure differential data stored within said ASCII file to generate a plot representing said fuel leaking from said fuel storage tank over a preset time period.

12. The portable fuel storage tank leak detection system of claim 11 further comprising an electrical cable which connects said differential pressure transducer to said signal conditioner to supply said electrical signal to said signal conditioner.

13. The portable fuel storage tank leak detection system of claim 11 further comprising a quick disconnect mechanism located within said reference tube, said quick disconnect mechanism allowing an operator to disconnect a lower portion of said reference tube including said seal housing and said differential pressure transducer from an upper portion of said reference tube.

14. The portable fuel storage tank leak detection system of claim 11 wherein the samples of said pressure differential data is visible on said display screen to said operator at one second intervals.

15. The portable fuel storage tank leak detection system of claim 11 wherein said differential pressure transducer has an operational capability when directly immersed in said fuel within said fuel storage tank.

16. The portable fuel storage tank leak detection system of claim 11 wherein said seal is a non-degrading seal comprising a flat seal, an o-ring seal, a ball shaped seal or a curvilinear seal.

17. The portable fuel storage tank of claim 11 wherein said reference tube has a straight cross-sectional area or a shaped cross-sectional area that matches, with a constant ratio, a cross-sectional shape of said fuel storage tank being tested for said fuel leaks.

18. A portable fuel storage tank leak detection system for detecting fuel leaks from a fuel storage tank comprising:

(a) a reference tube having a length of at least the diameter of said fuel storage tank wherein an operator lowers said reference tube into said fuel storage tank through an access port within said fuel storage tank to test for said fuel leaks;

(b) a seal housing positioned at a lower end of said reference tube;

(c) a seal affixed to the bottom end of said seal housing in slidable engagement with said reference tube, wherein said seal is normally held in an open position allowing fuel to enter said reference tube as said operator lowers said reference tube-into said fuel storage tank, said seal closing when said reference tube engages the bottom of said fuel storage tank to prevent said fuel within said reference tube from exiting said reference tube;

(d) a differential pressure transducer mounted on said seal housing, said differential pressure transducer measuring a pressure differential between said fuel within said reference tube and said fuel external to said reference tube and stored within said fuel storage tank, said differential pressure transducer generating an electrical signal containing pressure differential data which is indicative of said pressure differential measured by said differential pressure transducer, wherein said differential pressure transducer has an operational capability when directly immersed in said fuel within said fuel storage tank;

(e) a signal conditioner connected to said differential pressure transducer, said signal conditioner conditioning said electrical signal to provide an analog signal having a preset voltage range of approximately one volt to five volts;

(f) an electrical cable for connecting said differential pressure transducer to said signal conditioner to supply said electrical signal to said signal conditioner;

(g) a digital computer having an analog to digital converter, said analog to digital converter being connected to said signal conditioner to receive said analog signal and then convert said analog signal to a digital signal for processing by said digital computer;

(h) a computer program contained within said digital computer, said computer program controlling handling and interpretation of said pressure differential data by said digital computer, said computer program displaying said pressure differential data on a display screen for said digital computer, said pressure differential data being displayed on said display screen to allow said operator to monitor a rate of fuel leakage from said fuel storage tank, said computer program storing a sample of said pressure differential data to an ASCII file at approximately 45 second intervals; and (i) a spreadsheet software contained within said digital computer, said spreadsheet software utilizing samples of said pressure differential data stored within said ASCII file to generate a plot representing said fuel leaking from said fuel storage tank over a preset time period of approximately five hours; and (j) said portable fuel storage tank leak detection system being capable of measuring said fuel leaking from said fuel storage tank at a rate of 0.067 gallons per hour with a probability of detection of ninety five percent.

19. The portable fuel storage tank leak detection system of claim 18 wherein said seal is a non-degrading seal comprising a flat seal, an o-ring seal, a ball shaped seal or a curvilinear seal.

20. The portable fuel storage tank of claim 18 wherein said reference tube has a straight cross-sectional area or a shaped cross-sectional area that matches, with a constant ratio, a cross-sectional shape of said fuel storage tank being tested for said fuel leaks.

* * * * *